United States Patent [19]

Hughes et al.

[11] 3,909,727

[45] Sept. 30, 1975

[54] DATA SIGNALING NOISE SUPPRESSION SYSTEM

[75] Inventors: Carroll Duane Hughes, McMurray; Walter Charles Painter, Venetia, both of Pa.; Chandos Arthur Rypinski, Tiburon, Calif.

[73] Assignee: RCA Corporation, New York, N.Y.

[22] Filed: Apr. 19, 1974

[21] Appl. No.: 462,493

[52] U.S. Cl. ................. 325/478; 179/2 DP; 325/64

[51] Int. Cl.[2] ..................... H04B 1/10; H04M 11/00

[58] Field of Search ............ 179/2 DP, 3, 4, 15 BY, 179/84 VF; 325/478, 55, 64, 473, 403, 477, 480; 324/77 R

[56] References Cited

UNITED STATES PATENTS

| | | | |
|---|---|---|---|
| 2,881,251 | 4/1959 | Strip | 179/15 BY |
| 2,974,281 | 3/1961 | Feldman | 179/15 BY |
| 3,755,744 | 8/1973 | Fukata | 325/478 |

OTHER PUBLICATIONS

Terman, Radio Engineers' Handbook, McGraw-Hill, 1943, pp. 244–247.

*Primary Examiner*—George H. Libman
*Attorney, Agent, or Firm*—Edward J. Norton; Robert L. Troike

[57] ABSTRACT

The suppression of speaker noise caused by data signaling in a mobile radio system is achieved by detecting the presence of a single audio tone frequency over a time period and when the presence of such a tone is detected causing muting of the speaker of the mobile radio receiver.

4 Claims, 3 Drawing Figures

DATA SIGNALING NOISE SUPPRESSION SYSTEM

BACKGROUND OF THE INVENTION

This invention relates to data transmission on mobile radio or similar portable radio apparatus which normally communicates voice signals and more particularly to the suppression of audio interference which can arise in such apparatus from data signaling.

Because mobile radio and similar portable radio systems such as used by police, taxi cabs, etc. are generally operated in the minimum audio bandwidth necessary for speech intelligibility, it is not possible to use frequency division and separation filters to isolate data signaling from the normal voice transmission. Data transmissions required in police, fire, bus, taxi and other commerical or industrial radio systems are keyed on carrier tone at frequencies favorable for transmission within the audible audio band. To minimize interference, these transmissions are made as short as possible. They are limited in duration to two seconds by the Rules of the Federal Communications Commission.

In order to maximize the amount of information contained in such bursts, the data signaling is fully modulated and preempts the transmitter capacity from the voice use during the transmission. The result is that such data transmissions will be heard in the speakers of all mobile radio units in the system at a high audio volume. This sound is considered to be a major nuisance and disadvantage to the application of vehicular data systems.

While mobile telephone systems have used data signaling, the unit subscriber stations are generally "on hook" with the telephone handset until data signaling transmissions are completed. Both because there is no speaker and because there is no audio monitoring until the data transmissions are completed, these systems generally do not bear on the problem to which the present invention is applied.

On a few existing radio data systems, use is made of subaudible tone squelch to prevent this interference. When the data tone is present, logic circuits inhibit the transmission of the subaudible tone, and thus appropriately equipped receivers remain muted during the data transmission. There are two important difficulties with this technique. First, the response time when subaudible tone is restored is unspecified in existing systems, and will generally be between 100 and 400 milliseconds. This inverval is one during which the speaker of mobile units remain muted even though there is no objectionable data transmission present. This small interval of time during which communication is lost is highly objectionable in fast action communications systems such as those of taxi dispatchers. Moreover, this interval is about the same duration as the data messages, and therefore can greatly increase the time loss from data in a way that cannot be materially improved by speeding up the data transmission rate.

A further limitation of this approach is that the control leads for tone squelch circuits are generally internal to the transmitter-receiver unit and highly individualized, electrically, to particular models and manufacture of radios. This approach is very difficult to implement if a common type of data unit is to be retrofitted in a radio system with many different types of radio equipment. The control leads required are frequently not available in the cable to the radio transmitter-receiver unit, in addition to the problem of electrical incompatibilities encountered.

BRIEF DESCRIPTION OF INVENTION

Briefly, a receiver is provided which is responsive to a carrier wave modulated by voice audio frequency intelligence signals and data audio frequency intelligence signals at a frequency within the voice band of frequencies to detect the audio signals at an audio detector therein and to normally provide at the output thereof signals to an audio speaker. A data signal detector coupled between the audio detector and the speaker mutes the speaker in response to the persistance of a narrow band data signal over a given time period.

DETAILED DESCRIPTION

A more detailed description of the present invention follows in conjunction with the following drawings wherein.

Figure 1:
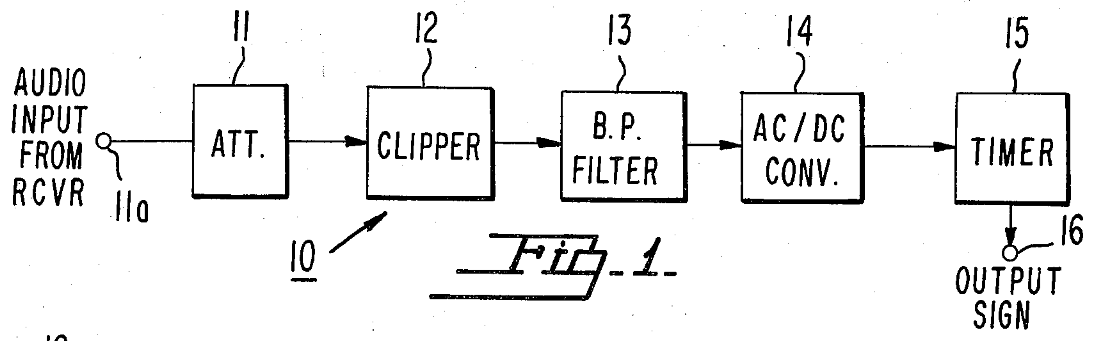
FIG. 1 is a block diagram of the data tone detector.

Referring to FIG. 1, the audio input from the detector of a radio receiver is coupled to attenuator 11 of detector 10 via terminal 11*a*. The attenuator 11 provides a means of scaling the expected audio input signals to comply with the input requirement of the input clipper amplifier. The output from the attenuator is coupled to the clipper amplifier 12. The clipper amplifier 12 includes non-linear feedback elements such that the output excursions are limited in amplitude to approximately ±E volts; where E is a selected output voltage value. The output from the clipper amplifier 12 is applied to a bandpass filter 13. The use of the clipper amplifier 12 insures that the bandpass filter is provided with a fairly uniform signal even though the clipper amplifier's audio input signal may vary in the range of 0.1 volts rms to 10 volts rms. The bandpass filter 13 accepts the broad band, amplitude limited audio signal from the clipper amplifier 12 and attenuates all but a narrow band of frequencies centered on the carrier tone of data transmissions. Thus, only the desired tone frequency signals and a small band of adjacent frequency signals appear at the output of the bandpass filter 13. Each data tone frequency signal appearing at the output of the bandpass filter 13 is rectified and filtered at the AC/DC converter 14 to provide a DC voltage that indicates that a carrier frequency equal to that of the data carrier frequency is being received.

A technical problem must be solved at this point in the operation of the detector 10 to determine whether this detected signal is the "front porch" of a data message or just a component of a voice message that happens to coincide in frequency to the data carrier. It has been found that any given frequency in a voice message will seldom persist for 50 consecutive milliseconds. This criterion can be used herein for determining whether the detected signal tone presents a data message or a voice message. The output from the AC/DC converter 14 is coupled to a varible timer 15. This variable timer 15 is used to measure the duration of the detected signal. If it is less than 50 milliseconds, the variable timer 15 does not respond and further processing of the detected signal is inhibited. If, on the other hand, the duration of the detected signal is 50 milliseconds or more, the timer 15 responds by providing an output signal at terminal 16 which may be utilized as is or in conjunction with auxiliary signals to provide a variety of functions such as that of disabling the audio suppressor of a mobile receiver. The timer 15 in a preferred embodiment may be one which can be set at different time measurements since the time required to reach a decision may differ with each radio system.

Figure 2:
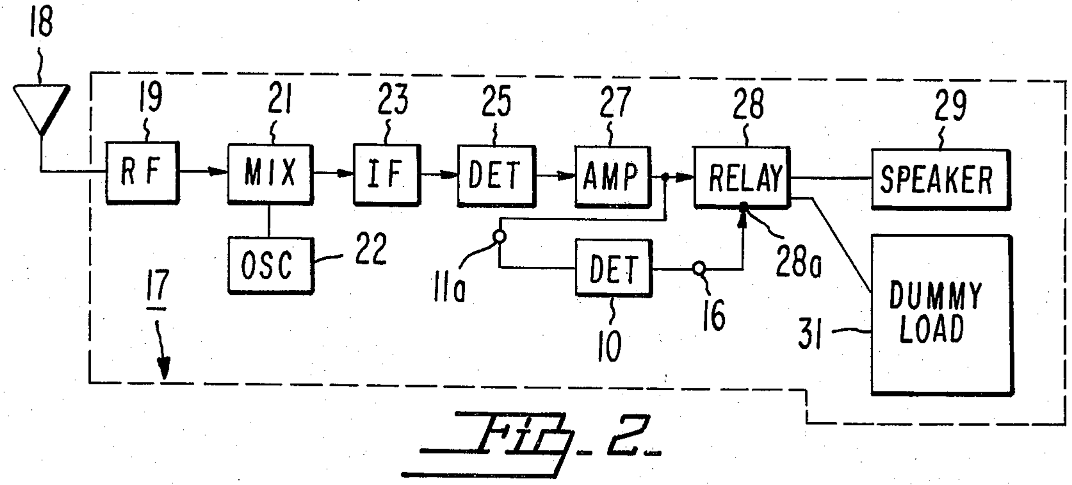
FIG. 2 is a block diagram of a receiver with data noise suppression.
Figure 3:
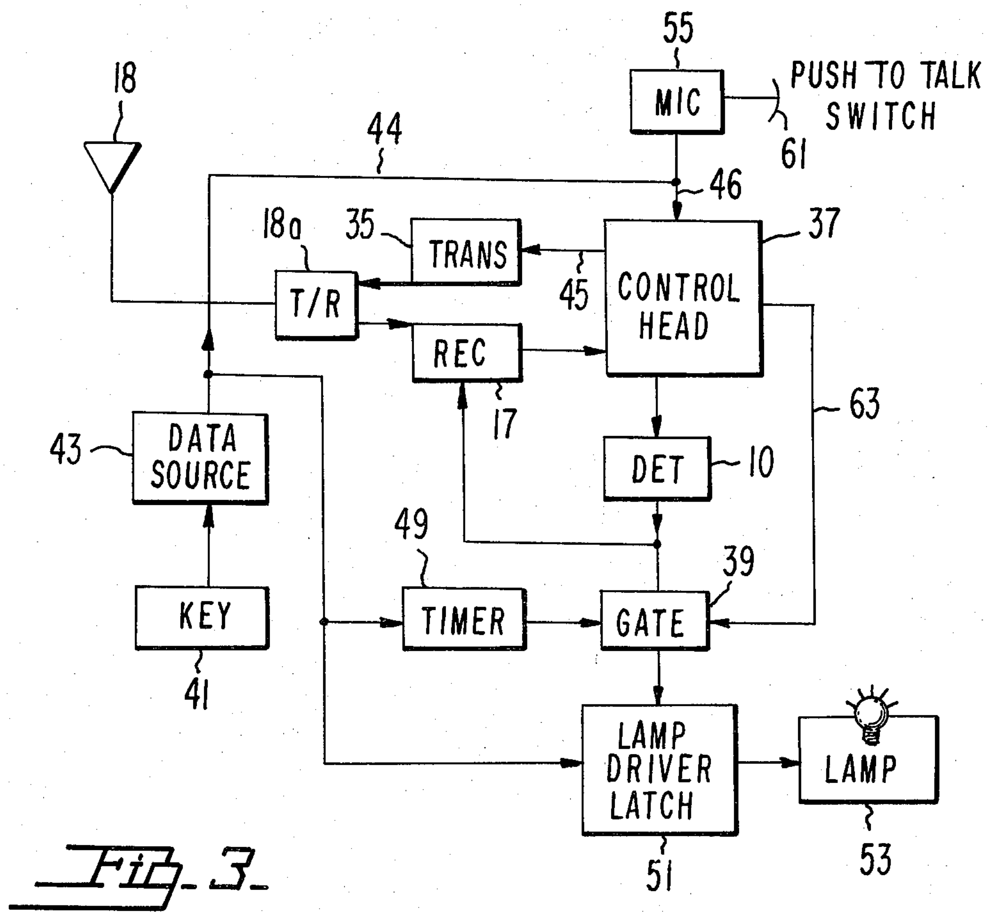
FIG. 3 is a system block diagram of a transceiver system with audio suppressor and an acknowledgement indicator.

Referring to FIG. 2, there is illustrated the simplest manner in which the audio tone detector may be used to provide the data interference suppression. In FIG. 2 there is illustrated a typical receiver including an RF stage 19, a mixer stage 21, an IF stage 23, a detector stage 25 and an audio output stage 27. The radio frequency signals coupled from antenna 18 are amplified through RF amplifier stage 19 and are coupled to mixer 21. At the mixer 21 the RF signals are hetrodyned with the local oscillator signals from oscillator 22 to provide IF frequency signals to stage 23. The intermediate frequency signals (IF) at stage 23 are amplified and may be converted to even lower IF frequency signals and applied to audio detector 25. The detected audio signals from detector 25 are applied to a typical audio amplifier stage 27. In providing a data interference suppressor, a relay 28 is coupled between the audio amplifier stage 27 and the audio speaker 29. When the relay 28 is in the normal operating mode, the audio signals from stage 27 are applied through the relay 28 to the speaker 29. The second output terminal from relay 28 is coupled to dummy load 31. The amplified output from audio detector 25 and amplifier 27 is also coupled to the data tone detector 10. The data tone detector 10 is like that described above in connection with FIG. 1. The output from detector 10 at terminal 16 is coupled to the gating terminal 28*a* of relay 28. When there is provided an output from the timer 15 of detector 10, the relay 28 changes from its normally conducting state of applying signals to speaker 29 to that of disconnecting the speaker 29 and applying the signals to the dummy load 31. In the operation of the arrangement discussed in FIG. 2, upon the reception of normal voice signals these signals are amplified and detected at detector 25, applied through audio amplifier 27 to the speaker 29 via relay 28. When the audio tone detector 10 detects the presence of a tone associated with a data message, namely the presence of a given tone of a time period determined by timer 15, the relay is activated at terminal 28*a* causing disconnection of speaker 29 and the connection of dummy load 31 to the output of the audio stage 27. By placing the output of the audio stage 27 to a dummy load, the impedance levels are maintained at the receiver power amplifier Turning to FIG. 3, there is illustrated a block diagram of a typical application of the data interference suppressor with an acknowledgement indicator. The antenna 18 is coupled via transmit-receive unit 18a to the transmitter 35 and receiver 17. The receiver 17 is like that described above in connection with FIG. 2. The receiver 17 includes not only the audio detection circuitry but also the relay, the speaker and the dummy load. The receiver 17, however, does not include the detector 10. The detected audio signals from the output of amplifier 27 (see FIG. 2), of receiver 17 are coupled through a control head 37 to detector 10 in FIG. 3. The output of detector 10 is coupled to gate 39 and to the receiver 17 at the relay 28 as illustrated in FIG. 2. To initiate a digital message for transmission by transmitter 35 one of the switches in keyboard 41 are activated. The output from the keyboard 41 is coupled to a data source 43. The data source 43 in response to the switch position in keyboard 41 modulates the transmitter 35 with a digital message. This modulation takes place via control head 37 and leads 44, 45 and 46. The modulation data message is transmitted by transmitter 35 via TR switch 18a and antenna 18. The data signals from data source 43 are coupled to timer 49 and lamp driver latch 51. The output of lamp driver latch 51 is coupled to a lamp 53. The lamp driver latch 51 in response to the data message from source 43 provides power to lamp 53 causing illumination thereof. The timer 49 in response to the data message from source 43 begins to measure an allowable time to receive an acknowledgement message from the data message being transmitted. At the end of the transmission of the data message the TR switch 18a switches to the receive position and is prepared to receive the acknowledgement message during the time period determined by timer 49. When the receiver 17 receives the acknowledgement message as detected by detector 10 via control head 37, the output from detector 10 switches relay 28 in receiver 17 to mute the speaker 29 and the output from detector 10 is coupled to gate 39 which in turn resets lamp driver latch 51 to extinguish lamp 53 whereby a reception of the transmission is acknowledged. If the microphone 55 coupled to control head 37 is energized by the push-to-talk switch 61 before the data message has been acknowledged, the TR switch 18a is switched to the transmit mode and the acknowledgement circuitry is returned to its normal or reset state to extinguish lamp 53 by regating gate 39 via lead 63.

What is claimed is:

1. A receiver system responsive to a carrier wave modulated by either voice audio intelligence signals or data audio tone intelligence signals at a given frequency within the voice band of frequencies for detecting said audio signals at a detector and providing the output thereof to an audio speaker wherein said data signals cause highly objectional noise in the output of said speaker, the improvement therewith comprising:

means for normally coupling the output from said detector to said speaker, and timed means including a clipper, a bandpass filter, an AC/DC converter and a timer coupled between said audio detector and said audio speaker responsive to the presence of a tone of said given frequency over a given time period for disconnecting said normally coupling means and thereby muting said speaker only during the presence of said tone.

2. The combinatin claimed in claim 1 wherein said bandpass filter is centered at said given audio frequency of said data signals.

3. The combination claimed in claim 2 wherein said time period is of sufficient length beyond 50 milliseconds to distinguish said data signal from a voice signal.

4. The combination claimed in claim 3 wherein said timed means includes an attenuator preceding the bandpass filter to limit the amplitude of the input signal to the bandpass filter.

* * * * *